J. M. WOLFE.
RODENT TRAP.
APPLICATION FILED MAY 16, 1912.
1,049,634.
Patented Jan. 7, 1913.
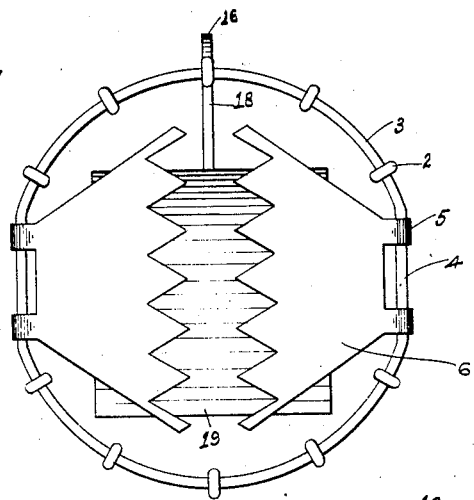
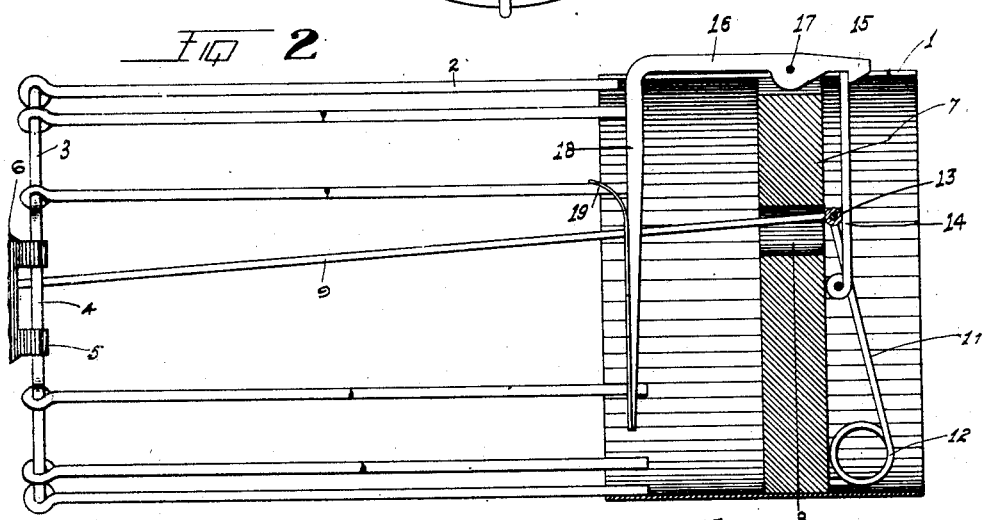
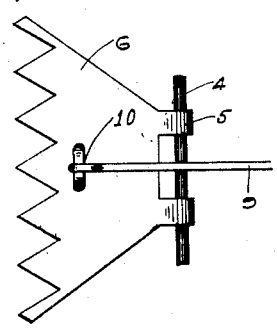
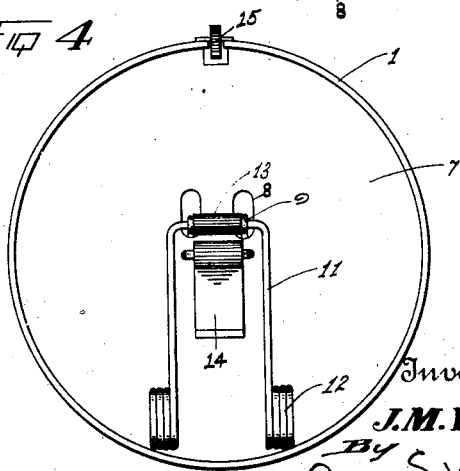
Witnesses
Clarence Smith
J. O. Webster
Inventor
J. M. Wolfe
By Percy S. Webster
Attorney

UNITED STATES PATENT OFFICE.

JACOB MILO WOLFE, OF LATHROP, CALIFORNIA.

RODENT-TRAP.

1,049,634. Specification of Letters Patent. Patented Jan. 7, 1913.

Application filed May 16, 1912. Serial No. 697,640.

*To all whom it may concern:*

Be it known that I, JACOB M. WOLFE. a citizen of the United States, residing at Lathrop, in the county of San Joaquin, State of California, have invented certain new and useful Improvements in Rodent-Traps; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in traps for rodents and is particularly adapted for gopher traps or for similar small animals, the object of the invention being to produce a trap which will have a positive release for the trigger and also one which will have hinged jaws adapted to close in against the animal from the outside of the trap to the inside thus having a tendency to force the rodent into the trap as they engage its body.

A further object of the invention is to produce a baitless trap but one which will be so constructed as to have no tendency to frighten the animal away.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claim.

In the drawings similar characters of reference indicate corresponding parts in the several views.

Figure 1 is a front elevation of the complete trap. Fig. 2 is a side elevation partly in section. Fig. 3 is a detached view of the jaw members. Fig. 4 is a rear elevation of the trap.

Referring now more particularly to the characters of reference on the drawings I first provide a cylindrical member 1 for one end of the trap connected with which are a plurality of wire bars 2 forming a cage, such bars being connected at their other ends with a ring 3. Such ring 3 has straight portions 4 to receive in a hinged manner, collars 5 on jaw members 6 such jaw members thus being capable of a swinging movement on their hinged points 5. Such jaws when in open position are adapted to project outside of the cage and to move inwardly when the trap is sprung by means of the following structure and operation to-wit: Disposed across the cylindrical member 1 is a solid disk 7 provided with two elongated slots 8 through which project rods 9 each being connected with one of the jaws 6 by means of a hook and eye structure as at 10. The ends of the rods 9 opposite to those ends which are connected with the jaws 6 are connected with a wire frame 11 provided at its lower end with coiled springs 12 secured in the disk 7. The upper end of the frame 11 is provided with a roller 13 against which a detent 14 is adapted to engage to push said frame 11 and said rods 9 into such position as will open the jaws 6 outward. Then the detent 14 engages a catch 15 on a lever 16 fulcrumed as at 17 to the disk 7 such lever then having an inwardly projecting trigger 18 projecting into the cylindrical member 1 between the jaws 6 and the disk 7.

In practice the trap is set in the run-way of the gopher and as is well known the gopher pushes his load ahead of him as he moves along, and hence he will push the same into the cage wires 2 between the jaws 6 until the trigger 18 is engaged. This operation will move the member 16 on its fulcrumed point 17 and thus disengage the catch 15 from the detent 14. The force of the springs 12 will then pull the frame 11 and rods 9 and close the jaws 6 inwardly to engage the body of the rodent as will be seen. Since these jaws 6 project outwardly from the cage when in open position they will close inwardly on the rodent thus having a tendency to force him into the cage rather than to have a tendency to force him out of the cage.

The member 19 is a plate mounted on the member 18 to form a surface which the rodent encounters as he enters the trap, to insure engagement with such member 18 to spring the trap.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A device of the character described, comprising a cage, a solid disk at one end of said cage, such disk being provided with two slots, a pair of jaws hinged on the other end of said cage, a rod on each jaw each of said rods projecting through one of slots, a spring pulled frame secured to said cage and connected with said rods, a detent hinged to said disk, a catch pivoted to said cage and adapted to engage said detent, and a trigger on said catch projecting into said cage, as described.

In testimony whereof I affix my signature in presence of two witnesses.

JACOB MILO WOLFE.

Witnesses:
JOSHUA B. WEBSTER,
CLARENCE M. SMITH.